United States Patent [19]
Bray

[11] Patent Number: 4,713,175
[45] Date of Patent: Dec. 15, 1987

[54] WATER PURIFIER COMPRISING STAGES MOUNTED SIDE-BY-SIDE TO UNITARY HEADER

[75] Inventor: Donald T. Bray, Escondido, Calif.

[73] Assignee: Nimbus Water Systems, Inc., Escondido, Calif.

[21] Appl. No.: 893,486

[22] Filed: Aug. 5, 1986

[51] Int. Cl.$^4$ ............................................. B01D 13/00
[52] U.S. Cl. ................................. 210/259; 210/266; 210/282; 210/295; 210/297; 210/356; 210/460; 210/321.83
[58] Field of Search ............... 210/259, 266, 282, 288, 210/295, 321.1, 321.5, 335, 356, 359, 433.2, 460, 498, 297

[56] References Cited

U.S. PATENT DOCUMENTS

| | | | |
|---|---|---|---|
| 2,837,032 | 6/1958 | Horsting | 210/356 X |
| 3,367,504 | 2/1968 | Westmoreland | 264/49 X |
| 3,542,199 | 11/1970 | Bray et al. | 210/116 |
| 4,039,452 | 8/1977 | Fernandez | 210/356 X |
| 4,540,489 | 9/1985 | Barnard | 210/287 |
| 4,595,500 | 6/1986 | Galbiati | 210/266 |
| 4,609,463 | 9/1986 | Macevicz et al. | 210/321.5 X |

*Primary Examiner*—David Sadowski
*Attorney, Agent, or Firm*—Fitch, Even, Tabin & Flannery

[57] ABSTRACT

A water purification system having a first pressure vessel containing a reverse-osmosis filter and a second separate pressure vessel containing an activated carbon prefilter operatively connected in series and upstream of the first pressure vessel by means of a common header. The activated carbon prefilter includes a particulate trap upstream of the activated carbon to trap sediment carried in the unpurified water. The particulate trap is compressible under operational water pressures attained in the system when the trap becomes clogged with sediment, which serves to crack or break away from the surface thereof particle accumulations clogging the trap, permitting flow to continue through the trap into the activated carbon and, subsequently, through the reverse-osmosis filter element.

6 Claims, 4 Drawing Figures

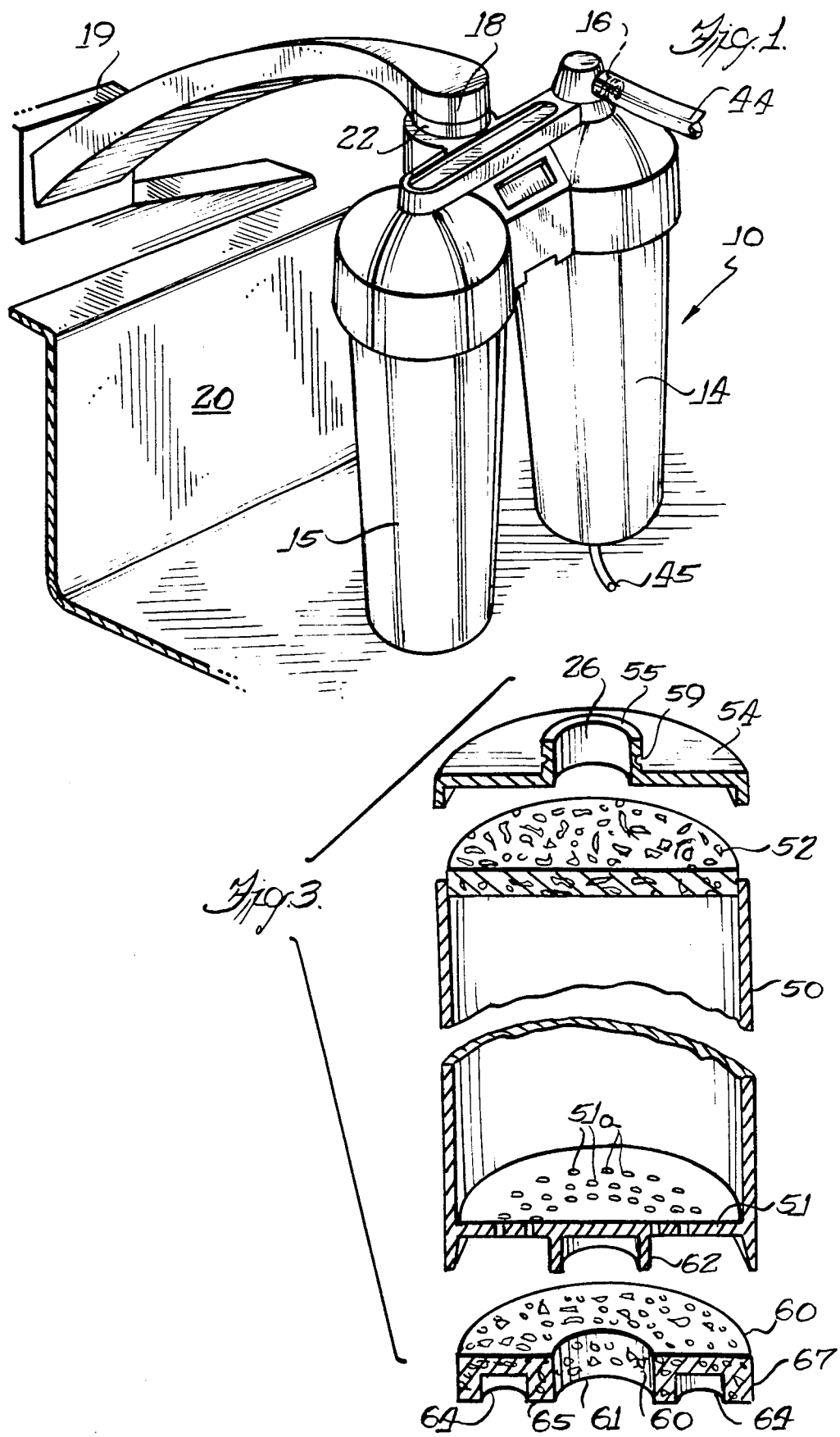

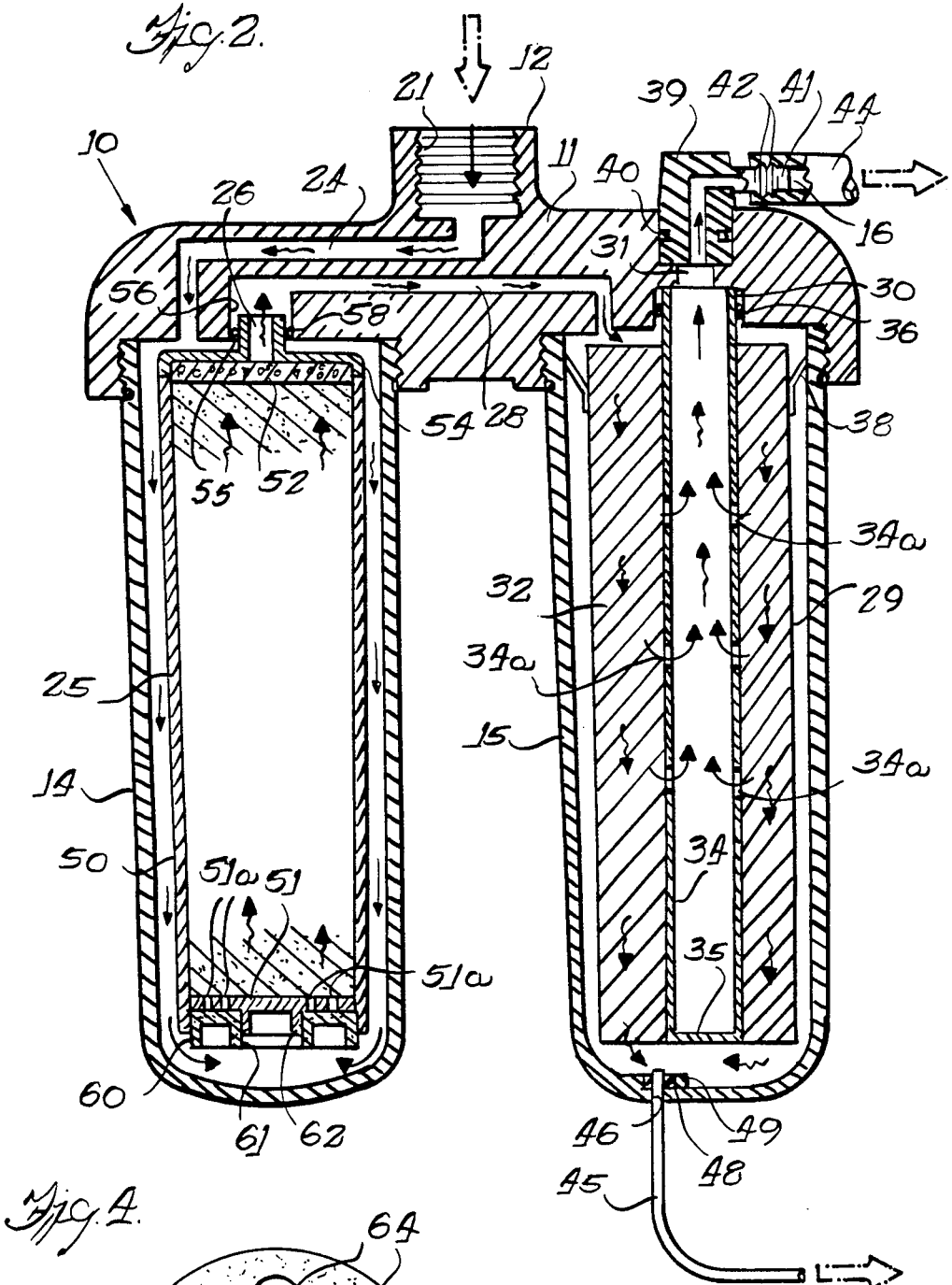
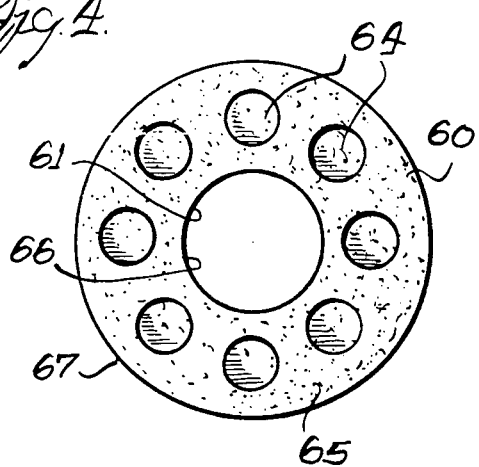

WATER PURIFIER COMPRISING STAGES MOUNTED SIDE-BY-SIDE TO UNITARY HEADER

The present invention relates to a water purification device and, more particularly, to a two-stage reverse-osmosis water purification device including a prefilter to remove impurities from the water that would otherwise have a detrimental effect on the longevity and efficiency of the reverse-osmosis filter element.

There has been a growing concern over the contamination of drinking water, extending even to water provided from municipal water supplies. Consequently, homeowners have taken a variety of measures to ensure an adequate supply of safe, clean drinking water, ranging from buying bottled water to installing water purification systems in their homes. While a variety of different types of home water purification systems are available (e.g., sediment filters, deionization systems, ion exchange/water softening systems, distillation systems, and activated carbon systems), systems utilizing reverse-osmosis filtration have proven superior in removing almost all types of pollutants with the greatest convenience and at reasonable expense. See, e.g., U.S. Pat. No. 3,542,199, which is herein incorporated by reference. A reverse-osmosis water purification device works, in general, by forcing water under pressure through a semipermeable membrane that permits water to pass through but is impermeable to certain impurities such as nitrates, heavy metals and salts, chemical fertilizers, and bacteria and viruses.

Water quality varies widely depending upon geographical location, and there has been a need to provide a single reverse-osmosis water purification system that works well with a minimal amount of servicing over a large range of locations, i.e., a system that will work uniformly well to purify tap water of widely varying quality. However, certain characteristics of the various materials used for reverse-osmosis filter membranes differ significantly. For example, cellulose acetate, a common reverse-osmosis membrane, is not bacteria-resistant (i.e., the bacteria commonly found in water use the cellulose acetate for food). Consequently, cellulose acetate membranes are generally used only where the water is chlorinated, which kills the bacteria. Further, cellulose acetate filter membranes are preferably used only with cold water having a low pH (less than 8). Certain other all-purpose membranes are bacteria-resistant, but are not usable with hard water. Polyamide filter membranes are usable under a greater variety of conditions than other membranes because they are resistant to bacteria and are effective through a wide range of temperatures and pHs. However, polyamide membranes are chlorine-degradable, but will function effectively for a reasonable period of time to produce quantities of drinking water sufficient for family use, provided the filter membrane is only exposed to low concentrations of chlorine (approximately 0.1–0.2 ppm of chlorine in the water that is forced through the reverse-osmosis membrane).

Activated carbon is known to adsorb chlorine. However, over time, the activated carbon becomes saturated with chlorine and its pores clogged with sediment carried in the water so that its effectiveness in removing chlorine from the water is drastically reduced. Activated carbon prefilters have been used in water purification systems which are mounted under the counter, where size constraints are not a great concern and large amounts of carbon can be used so as to provide a reasonable service-free life for the prefilter before the carbon becomes saturated with chlorine and clogged with sediment. Conversely, with over-the-counter water purification units (e.g., water purification units that either rest on the countertop or that "hang-on" or are affixed directly to the water faucet so as to be supported thereby), the size of the unit is a major factor affecting its acceptability to consumers. This size limitation has prevented the use of an amount of activated carbon sufficient to reduce the chlorine content of the water to a level of approximately 0.1–0.2 ppm for a reasonable amount of time, e.g., six months to a year, before becoming saturated with chlorine or, more likely, clogged with sediments, at which time the user must replace the prefilter.

Accordingly, it is a principal object of the present invention to provide an over-the-counter reverse-osmosis water purification system which is effective under a wide variety of water conditions and has a reasonable service life before replacement of the filter elements is required.

More particularly, it is an object to provide such a water purification system that, despite being required to use relatively small amounts of activated carbon due to size restrictions associated with over-the-counter systems, is able to effectively reduce the chlorine content of the water to a level that provides a reasonable service life for the reverse-osmosis filter membrane, while also having a similarly reasonable service life for the activated carbon prefilter.

These objects, as well as others that will become apparent upon reference to the following detailed description and accompanying drawing, are provided by a water purification system having a first pressure vessel containing a reverse-osmosis filter and a second separate pressure vessel containing an activated carbon prefilter operatively connected upstream of the first pressure vessel by means of a common header. The activated carbon prefilter includes a particulate trap upstream of the activated carbon to trap sediment carried in the unpurified water. The particulate trap is compressible under the operational water pressures attained when the trap becomes clogged with sediment to crack or break away the particles clogging the trap from the surface thereof, thus permitting flow to continue through the trap into the activated carbon and, subsequently, through the reverse-osmosis filter element.

BRIEF DESCRIPTION OF THE DRAWINGS

FIG. 1 is a perspective view showing a water purification system embodying the instant invention secured to the nozzle of a faucet;

FIG. 2 is a cross-sectional view of the inventive water purification system showing the flow path of the water through the system;

FIG. 3 is an exploded cross-sectional perspective view of the prefilter shown in FIG. 2; and FIG. 4 is a bottom view of the particulate trap shown in FIG. 3.

DETAILED DESCRIPTION OF THE PREFERRED EMBODIMENT

Turning to the figures of the drawing, which are by way of illustration and not limitation, there is seen a preferred embodiment of a "hang-on" type over-the-counter water purification system, generally indicated by 10, embodying the present invention. (To aid in the description of the water purification system 10, "downstream" will be used to indicate the direction of flow of water through the system during purification, while "upstream" indicates a direction through the system opposite the flow.) The system 10 includes a common header 11 which receives tap water through an inlet 12 (see FIG. 2) and directs it sequentially (as indicated by the numerous arrows) through filter elements contained in pressure vessels 14 and 15 that are screwed into the header 11, after which the pure water exits the header 11 at 16. The header 11 of the system 10 may be directly mounted to the nozzle 18 of a faucet 19 overlying a basin or sink 20, the interior of the inlet 12 of the header 11 being threaded at 21 to receive an adapter 22 to secure the header 11 to the nozzle 18. The adapter 22 may include a quick-disconnect coupling (not shown) of a known design to permit fast and simple attachment and removal of the system 10 with respect to the nozzle 18. Alternatively, the system 10 may be supported on the countertop adjacent the faucet 19 by a stand (not shown), the inlet 12 of the header 11 being connected to the nozzle 18 by a length of flexible tubing (also not shown) so that tap water may be introduced into the system 10.

After unpurified tap water enters the header 11, it is directed through a channel 24 in the header to the pressure vessel 14 having a compartment within which there is an activated carbon prefilter 25. After exiting the prefilter 25 at outlet 26, the water flows downstream through a channel 28 to enter the pressure vessel 15 having a compartment within which a reverse-osmosis filter element 29 is located. Purified water that passes radially inward through the filter element 29 exits an outlet 30 on the filter element 29 and reenters the header 11 to flow through a channel 31 to the outlet 16 of the header 11.

The reverse-osmosis filter element 29 is well-known in the art and includes a semipermeable membrane 32 spirally wrapped about a tubular core 34 in conjunction with a porous material (not shown) as described in U.S. Pat. No. 3,367,504, which is herein incorporated by reference. Specifically, the filter element 29 includes an envelope formed by a porous material in between two layers of a reverse-osmosis semipermeable membrane, with the envelope being spirally wound about the support core 34 with a separator grid separating adjacent envelopes. In practice, the filter element includes at least about 10 sq. cm of semi-permeable membrane surface area per cu. cm of volume of the filter element 29. The core 34 is closed at its lower end 35, but is open at its upper end 30, which is sealed with respect to the header 11 by means of an elastomeric O-ring gasket 36. The filter element 29 is sealed with respect to the pressure vessel 15 by means of a chevron-type seal 38 so that, during operation, water entering the pressure vessel 15 from the prefilter 25 from channel 28 is forced downwardly through the separator grid of the filter element 29, where a portion of the water permeates through the membrane and travels spirally inward through the porous material and into the support core 34 through the perforations 34a therein. This water is substantially free from impurities and flows upwardly through the filter outlet 30 and channel 31 to exit the system 10 through a swivel connection 39. As illustrated, the swivel connection 39 is sealed with respect to the header by means of an O-ring gasket 40 and includes a projecting tubular portion 44 with radial retaining ribs 42 for securing a length of flexible tubing 44 thereto.

The tubing 44 extends to a separate reservoir (not shown) in which the purified water is collected and stored until needed.

The portion of the water entering the pressure vessel 15, but not permeating through the membrane and flowing into the support core 34, flows axially downwardly through the separator grid of the filter element 29, carrying all the impurities that do not pass through the membrane 32 to the bottom of the pressure vessel 15, where the water and impurities are discharged from the pressure vessel 15 through a capillary tube 45 into the sink 20. The capillary tube 45 extends through an opening 46 in the pressure vessel 15 and, due to its length and small diameter, provides resistance to flow therethrough to maintain the desired water pressure in the pressure vessel 15 which is sufficient to force a portion of the water entering the pressure vessel 15 through the semipermeable reverse-osmosis membrane 32. Thus, the flow rate is controlled by use of the capillary tube 45, which is held in place by an elastic ring 48 that serves as a sealing gasket at the opening 46 where the tube exits the pressure vessel housing. The ring 48 engages the exterior of the capillary tube 45 just inside of the pressure vessel 15, being located in a frustoconical seat 49 centered about the opening 46. An increase in pressure within the vessel 15 forces the elastic ring 48 into tighter contact with the tube 45 and frustoconical seat 49 to increase the seal to prevent untreated water from leaking from vessel 15. The amount of blowdown flow is controlled by the size of the inside diameter and the length of the capillary tube 45. The inside diameter will be about 0.5 mm and its length will be about 25 to 50 centimeters long. The tubing may also be coiled and placed inside the pressure vessel 15 except for the outlet end extending a short distance through the wall, or it can extend almost entirely outside as shown in FIG. 2.

In order to ensure that the amount of chlorine in the water entering the reverse-osmosis filter element 29 is sufficiently low so that the filter element 29 efficiently functions to provide an adequate supply of pure drinking water to an average-sized family over a period of six months to a year before replacement of the filter element 29 is required, unpurified tap water is initially passed through the activated carbon prefilter 25 supported in the pressure vessel 14. The prefilter 25 comprises a thin plastic cylindrical housing 50 having a recessed, bottom web 51 integral therewith and having perforations 51a. The cylinder 50 is filled with between approximately 60 to 150 grams, preferably about 80 grams, of activated carbon preferably having a particulate size between about approximately 0.5 mm and about 0.05 mm and a pore size of approximately 200 microns. Typically this amount of carbon will be used with a filter 29 having between about 250 and 2500 sq. cm. of membrane. To retain the activated carbon in the housing 50 and to prevent carbon fines from being carried into the reverse-osmosis filter 29, a porous polypropylene retaining disk 52 is placed within the housing 50 downstream of the activated carbon. After the housing 50 is filled with carbon, the retaining disk 52 is placed in the open upper end of the housing 50, which is then closed with a plastic top 54 ultrasonically welded to the housing 50. The retaining disk 57 may have a pore size of approximately 200 microns. The top 54 includes a raised central outlet port 55 received in a seat 56 in the header 11. The seat 56 is in fluid communication with the channel 28, and the carbon prefilter 25 is sealed with respect to the seat 56 by means of an O-ring gasket 58 received in a groove 59 on the exterior of the raised outlet port 55. Accordingly, no water may exit the pressure vessel 14 and enter the channel 28 leading to the reverse-osmosis filter element 29 without first passing through the carbon prefilter 25.

In keeping with the invention, means is provided for preventing the activated carbon in the prefilter 25 from becoming clogged with sediment or particulates carried in the unpurified tap water, thus preventing the activated carbon from becoming prematurely ineffective in its primary function of removing chlorine from the water, and consequently resulting in early end excessive chlorine degradation of the reverse-osmosis filter element 29. To this end, a particulate trap 60 in the form of a ring-shaped sponge is located within the pressure vessel 14 upstream of the activated carbon prefilter 25. The sponge 60 is preferably made of polyester and has a pore size less than that of the activated carbon in order to inhibit the entry of particulates into the housing 50 that could clog the pores in the activated carbon. As illustrated, the particulate trap sponge 60 is in the form of a disk or ring, sized in diameter to fit snugly on the exterior of the housing within the recess defined by the housing 50 and the bottom web 51. The sponge 60 has a central aperture 61 which is received upon an outwardly-extending cylindrical projection 62 on the bottom of the web 51 to positively locate the sponge with respect to the housing. While the central portion of the projecting member 62 is hollow, there are no perforations in the bottom web in the area circumscribed by the projection 62 so that all water flowing into the housing 50 must pass through the particulate sponge 60.

Over time, particulate matter will collect on the bottom exposed surface of the particulate trap sponge 60, restricting flow into the prefilter 25 and, consequently, reducing the rate at which water is purified by the system 10. However, as the pressure differential across the sponge 60 increases due to the clogging with sediment, the pressure will compress the sponge 60, cracking away from the surface of the sponge at least a portion of the caked-on sediment, thus opening additional pores through which water may flow through the perforations 51a in web 51 in the prefilter 25 and increasing the flow rate through the system 10. To encourage the particulate sponge 60 to deform when subjected to a pressure differential due to clogging of the particulate trap 60 with sediment, the sponge 60 is formed with a plurality of recesses or apertures 64 in the surface 65 between its radially inner and outer edges 66, 67, respectively. The recesses 64 extend only partially through the sponge 60 and serve to enhance the radial compression of the sponge 60 to effectively open up cracks in the sediment that may be caked onto the sponge. While the illustrated sponge 60 has a series of apertures 64, any holes, slots, concentric rings, etc. in the sponge 60 that permit radial pressure, as well as axial pressure, to act on the sponge will work equally well.

Eventually, the amount of sediment trapped by the sponge 60 will be sufficient to completely compress or collapse the sponge 60 against the support web 51, thus slowing down and eventually stopping the flow of tap water through the sponge 60. However, at such a time it is likely that the activated carbon in the entire prefilter 25 will still be able to adsorb chlorine from the tap water that passes therethrough. Accordingly, the entire prefilter 25 does not need to be replaced, but only the sponge 60 is cleaned. The system 10 can be restored to satisfactory operating conditions simply by unscrewing the pressure vessel 14 from the header 11 to remove the prefilter 25 from the pressure vessel, and then removing the sponge 60 from its recess and washing off the mud. The sponge 60 is then replaced onto the housing 50, and the prefilter 25 and pressure vessel are reassembled onto the header 11. Thus, even if the tap water contains large amounts of sediments that may require frequent simple cleaning of the particulate sponge 60, the activated carbon within the prefilter 25 can be used to nearly the full extent of its useful life as regards its primary function of removing chlorine.

To provide an example of the effectiveness of the above-described system, polyamide reverse-osmosis filter elements of the type used in the present invention, when subjected to tap water having approximately 1.5 ppm chlorine, have an "on-line" life of only between about 17 to 33 days during which the filter will reject 90 percent or more of most impurities. Operating the reverse-osmosis filter under such conditions would require replacing the filter element at least monthly—a frequency far too great to be suitable for home use. It is calculated that, if the level of chlorine in the tap water were approximately 0.2. ppm, an "on-line" life of from 100 to 250 days could be expected for the reverse-osmosis membrane. In the illustrated system, in order to produce between 3 and 6 gallons per day of purified water, the tap water flow rate to the system must be between approximately 40 to 160 ml per minute. At such a range of flow rates, an activated carbon prefilter of approximately 80 grams of activated carbon and having a particle size between approximately 200 to 1,000 microns, will remove between approximately 90-plus to 99-plus percent of the chlorine in the tap water having 1 ppm of chlorine. The particulate activated carbon is packed into the housing 50 so that it occupies about 150 cc of space, and in this condition, the effective "pore size" of the passageways through this packed particulate mass average about 200 microns. With the activated carbon being able to adsorb approximately 0.7 grams of chlorine for each gram of carbon, it is calculated that the 80 grams of carbon should be able to remove approximately 56 grams of chlorine, which corresponds to a flow of 1 ppm chlorine tap water at a rate of 160 ml per minute for 240 days. Accordingly, an activated carbon prefilter of the size contemplated by the present invention would, for a sufficiently long period of time, serve to reduce the chlorine in the water to be treated by the reverse-osmosis filter to a level that would provide a satisfactory "on-line" life for the reverse-osmosis filter membrane.

However, in addition to the chlorine, tap water may carry up to approximately 1 ppm of particulates or sediment. At a flow rate of 160 ml per minute, it is calculated that up to 38 grams of sediment could be deposited on the activated carbon in the prefilter over a period of six months. If such an amount of sediment were to cake on the activated carbon, it would significantly reduce the ability of the activated carbon to adsorb chlorine and thus impair its effectiveness. Thus, absent the above-described prefilter including a particulate trap means, an over-the-counter reverse-osmosis water purification system with a chlorine degradable membrane and having a reasonable service life could not be obtained.

Thus an over-the-counter purification system utilizing a reverse-osmosis filter is provided which is able to effectively reduce the chlorine content of the water to a level that provides a reasonable service life for the chlorine-degradable reverse-osmosis filter membrane, while using only relatively small amounts of activated carbon consistent with such over-the-counter environment. While the invention has been described in terms of the preferred embodiment, there is no intent to limit the invention to the same. On the contrary, it is intended to cover all equivalents and modifications within the scope of the appended claims.

What is claimed is:

1. A water purification device having at least three stages for treating pressurized tap water, comprising:
   an activated carbon prefilter;
   a reverse-osmosis element;
   a sediment filter upstream of said activated carbon prefilter to prevent clogging of said activated carbon prefilter with sediment;
   a first unitary container containing said activated carbon prefilter and said sediment filter, means connecting said activated carbon prefilter and said sediment filter in serial relationship with said sediment filter upstream of said activated carbon prefilter, and said first unitary container having an open end for releasable attachment to a header;
   a second unitary container containing said reverse-osmosis element and having an open end for releasable attachment to a header;
   a unitary header including first and second container-attaching means directly releasably attached to the open ends of said first and said second containers, so that said first and said second containers are mounted in side-by-side relationship, means serially connecting said first and said second containers together in serial connection with an upstream unpurified water inlet defined by said unitary header and a downstream purified water outlet channel defined by said unitary header such that said sediment filter and said activated carbon prefilter are connected upstream of said reverse-osmosis element, whereby said sediment filter and said activated carbon prefilter are separately and independently accessible with respect to said reverse-osmosis element to facilitate separate maintenance operations on the respective water purifying components contained within said containers.

2. The water purification device of claim 1 wherein said first and said second containers are disposed in a generally vertical direction and said sediment filter comprises sponge material disposed beneath said activated carbon prefilter in upstream relationship therewith whereby sediment trapped in said sediment filter is prevented from clogging said activated carbon prefilter.

3. The water purification device of claim 2 wherein said sponge material has a generally ring-like configuration defining at least one recess on the upstream side thereof which causes said sponge material to be compressed in axial and radial directions in response to a build-up of pressure across said sponge material, whereby said sponge material is compressed under water pressures attained in said first unitary container when said sediment filter sponge material is clogged with sediment, so as to break a build-up of sediment particles covering the upstream side of said sediment filter.

4. The device of claim 2 wherein said activated carbon prefilter has a pore size of preselected dimension and said sediment filter sponge material has a smaller pore size whereby said sediment filter effectively prevents sediment of a minimum preselected dimension from entering said activated carbon prefilter.

5. The device of claim 1 wherein said device further comprises a particulate retaining member disposed in said first unitary container downstream of said activated carbon prefilter, to prevent particulates from passing from said activated carbon prefilter to said reverse-osmosis element.

6. The device of claim 1 wherein said activated carbon prefilter includes between approximately 60 and 150 grams of activated carbon, and said reverse-osmosis element contains between 250 and 2500 square centimeters of membrane so as to produce purified water at rates up to 160 milliliters per minute.

* * * * *